J. A. GLENN.
RIM CONSTRUCTION.
APPLICATION FILED APR. 26, 1912.
1,063,531.
Patented June 3, 1913.
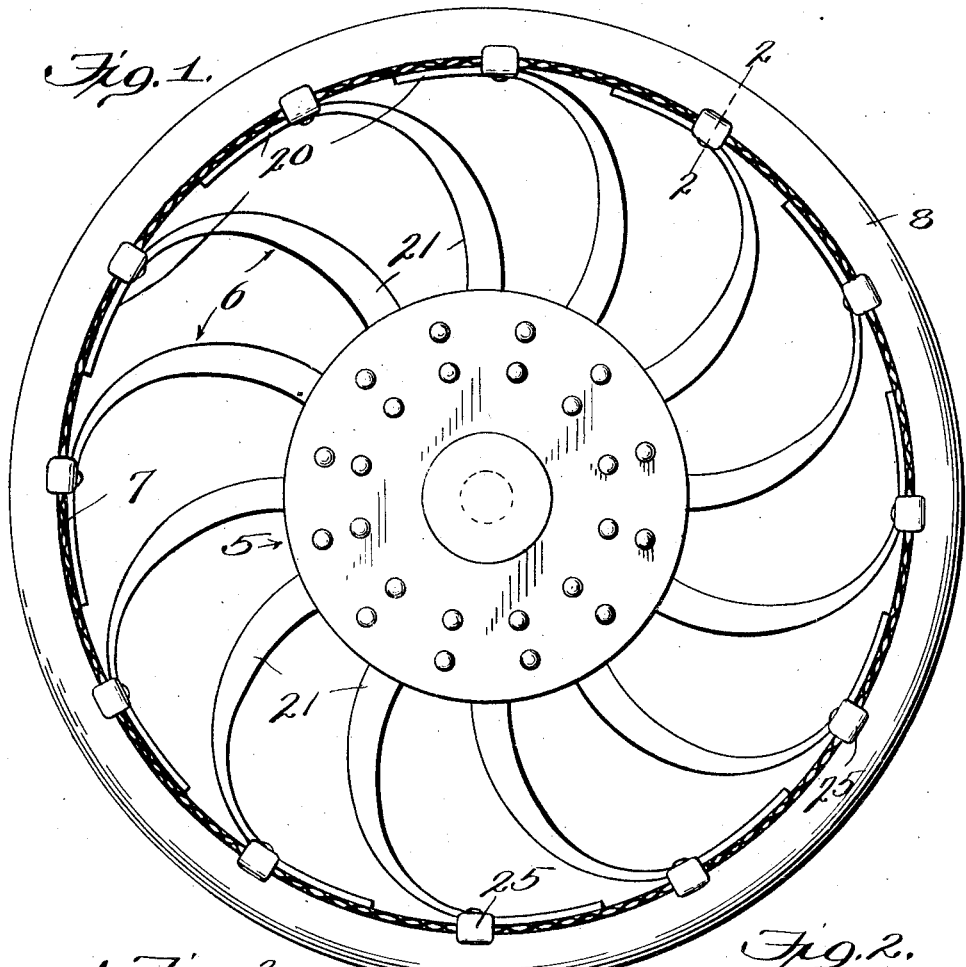
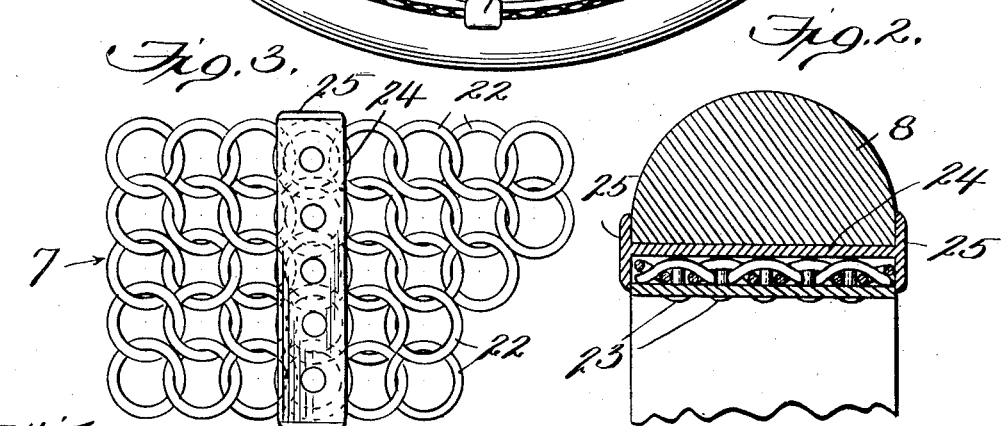
Witnesses
Inventor
James A. Glenn

UNITED STATES PATENT OFFICE.

JAMES A. GLENN, OF ALBANY, NEW YORK.

RIM CONSTRUCTION.

1,063,531. Specification of Letters Patent. Patented June 3, 1913.

Application filed April 26, 1912. Serial No. 693,411.

*To all whom it may concern:*

Be it known that I, JAMES A. GLENN, a citizen of the United States, residing at Albany, in the county of Albany and State of New York, have invented new and useful Improvements in Rim Construction, of which the following is a specification.

The present invention has reference to rim constructions, and it comprehends, briefly, an improved form of flexible rim which is especially applicable to wheels of the so-called "spring" or "spring spoke" type and is constructed in such a manner as to retain its desired flexibility under all conditions, as opposed to the ordinary steel band-rim which, when bent longitudinally by the tire, loses much of its "giving power" and becomes, in effect, a comparatively rigid part.

An embodiment of the invention is illustrated in the accompanying drawing, whereof—

Figure 1 is a side elevation of a spring wheel equipped with the improved rim; Fig. 2 is an enlarged transverse section taken on the line 2—2 of Fig. 1; Fig. 3 is an enlarged fragmental plan view of the rim; and Fig. 4 is a detail view of one of the links of which the rim is composed.

As shown in said drawing, the wheel comprises the following main parts, viz., the hub 5, spokes 6, rim 7, and tire 8. All of these parts, with the exception of the rim, may be of the conventional type or may have any other suitable construction, the spokes, however, being preferably of the form shown and described in my prior application, Serial No. 670,337, filed January 9, 1912, of which the present application is a division. These spokes are constructed of steel and each comprises a flat, springy outer portion or tongue 20 and a rigid body portion 21, the first-mentioned portion pressing directly against and being connected with rim 7, so as to maintain that element, which is extremely flexible, taut under all conditions.

In the construction illustrated, the aforesaid rim element 7 consists solely of a continuous band of metal fabric formed by a series of rows of links 22 interwoven or connected together after the manner of chain mail. These links are bent inwardly or outwardly, as the case may be, at the points where they cross one another, and, as a result, the surfaces of the band thus produced are rendered as nearly as possible smooth or flat.

The outer surfaces of the spoke tongues 20 contact with the inner surface of the flexible band or rim, as will be understood, and are fastened thereto by means of flat-headed bolts 23 that are passed through the links 22 and through registering openings formed in the tongues and in a series of transversely-arranged metal stays 24 disposed against the outer surface of the rim. The stays are preferably provided with terminal flanges 25 which extend laterally in opposite directions across the edges of the rim and into engagement with the solid rubber tire.

It will be understood from the foregoing that the flexible band of interwoven links constitutes the entire rim of the wheel and wholly takes the place of the usual band or strip of steel or other material by which the rim is generally formed. Moreover, the present rim is flexible under all conditions, yet is non-stretchable, which is an obvious desideratum, since any elongation or widening thereof would tend to slacken the rim and detract from its supporting action upon the tire.

I claim as my invention:

1. In a wheel, the combination, with a hub and a series of radiating spokes; of a rim to which said spokes are attached comprising a band of metal fabric formed of rows of links interwoven together.

2. In a wheel, the combination, with a hub and a series of radiating spokes; of a rim to which said spokes are attached comprising a band of metal fabric formed of rows of links interwoven together and having their mutually-intersecting portions bent to produce approximately flat inner and outer surfaces.

In testimony whereof I have hereunto set my hand in presence of two subscribing witnesses.

JAMES A. GLENN.

Witnesses:
C. H. PETRIE,
H. C. BROWN.

Copies of this patent may be obtained for five cents each, by addressing the "Commissioner of Patents, Washington, D. C."